United States Patent
Vaananen

(10) Patent No.: US 9,264,136 B2
(45) Date of Patent: Feb. 16, 2016

(54) BROADBAND WIRELESS COMMUNICATION SYSTEM AND METHOD

(76) Inventor: Mikko Kalervo Vaananen, Espoo (FI)

( * ) Notice: Subject to any disclaimer, the term of this patent is extended or adjusted under 35 U.S.C. 154(b) by 2207 days.

(21) Appl. No.: 10/504,418

(22) PCT Filed: Feb. 20, 2003

(86) PCT No.: PCT/FI03/00124
§ 371 (c)(1),
(2), (4) Date: Aug. 13, 2004

(87) PCT Pub. No.: WO03/071719
PCT Pub. Date: Aug. 28, 2003

(65) Prior Publication Data
US 2005/0158059 A1    Jul. 21, 2005

(30) Foreign Application Priority Data

Feb. 22, 2002  (FI) ..................... 20020350
Apr. 11, 2002  (FI) ..................... 20020702

(51) Int. Cl.
*H04B 10/112*  (2013.01)

(52) U.S. Cl.
CPC ................. *H04B 10/1121* (2013.01)

(58) Field of Classification Search
USPC .................................... 398/25, 118
See application file for complete search history.

(56) References Cited

U.S. PATENT DOCUMENTS

| | | | |
|---|---|---|---|
| 5,264,955 A | 11/1993 | Sakanaka et al. | |
| 5,680,241 A | 10/1997 | Sakanaka et al. | |
| 5,966,229 A | 10/1999 | Dodley et al. | |
| 2002/0033982 A1* | 3/2002 | Dewenter ................ | 359/172 |
| 2002/0122230 A1* | 9/2002 | Izadpanah et al. ......... | 359/145 |
| 2002/0122231 A1 | 9/2002 | Verbana et al. | |
| 2004/0208602 A1* | 10/2004 | Plante ................... | 398/140 |

FOREIGN PATENT DOCUMENTS

| | | |
|---|---|---|
| EP | 0 661 838 | 7/1995 |
| WO | WO 00/04653 | 1/2000 |
| WO | 01/06663 | 1/2001 |
| WO | 01/52450 | 7/2001 |
| WO | 02/061980 | 8/2002 |
| WO | WO 02/061959 | 8/2002 |

OTHER PUBLICATIONS

S. Blaser et al., "Free-space optical data link using Peltier-cooled quantum cascade laser", Electronics Letters, Jun. 7, 2001, vol. 37, No. 12, 2 pages.

* cited by examiner

*Primary Examiner* — Shi K Li

(57) ABSTRACT

Free space optical communication is plagued by interruptions in the connections caused by atmospheric phenomena, such as weather. A wireless beam transmission system includes at least one transmitter (110) and accommodates several wavelengths, and at least one transmission wavelength is arranged to be chosen based on spectral absorption measurements of the atmosphere in the carrier beam path of communication. The invention concerns also a transceiver for repeating wireless optical communication signals. The long range and high reliability of spectroscopically sensitive light beams at a penetrating frequency allow the affordable provisioning of high bandwidth optical or IR communication connections to devices and buildings that were previously either very expensively connected to the fiber optic backbone networks, expensive low bandwidth radio or microwave networks, or unreachable by traditional free space optics solutions.

10 Claims, 19 Drawing Sheets

BROADBAND WIRELESS COMMUNICATION SYSTEM AND METHOD

FIELD OF INVENTION

The invention relates to the field of free space optics, or more generally to communication below radio frequencies. More specifically, the invention also relates to a device and method for extending the range and reliability of high frequency transmitters and receivers even at inclement weather. In addition the invention also relates to a radiation beam routing device and method to provide communication to a receiver out of line of sight from the transmitter.

BACKGROUND

Over the recent years a concept known as Free Space Optics has surfaced in the context of wireless broadband access as a method of providing high bandwidth communication connections to fixed locations, such as homes and offices. In prior art FSO schemes a laser beam between a transmitter and a receiver is used to connect a building to a communication network. A laser beam can carry information with a high bandwidth and can be used to provide IP and Ethernet communication, or any data communication to buildings.

Current FSO systems also have very short connections between transmitters and receivers, typically between 200-1000 m. This is primarily due to divergence and attenuation in prior art FSO links. Especially inclement weather such as fog, rain, mist or snow increases the attenuation, causes disturbances, and thus reduces the reliability of the FSO link. The prior art FSO links typically utilise one static laser at a fixed wavelength.

However, prior art also features a publication U.S. Pat. No. 5,966,229 where preferable wavelengths are deduced from an atmospheric spectral simulator, which may either simulate the atmosphere, or take a sample from 10-50 cm gas sample near the transmitter. The transmission wavelength is then tuned according to the measured spectrum. There is a serious shortcoming with this prior art method, the atmosphere is very inhomogeneous by nature, so no sample from a local optical path can really be representative of the spectrum of the path between the transmitter and the receiver, which is hundreds of meters or even kilometers. This document is cited here as reference. A method utilising the same concept appears also in publication WO 02/061959 A2, which is also cited here as reference.

A further problem with prior art FSO systems is that due to the short wavelength of the laser, line of sight is required between the transmitter and the receiver. This problem is especially highlighted in architectures where there is one central hub to several receivers. One inadequate attempt to solve this problem has been to arrange the transmitters and receivers in a mesh configuration, so that every receiver would see at least one other receiver, and thus have at least one active connection in the mesh. WO 00/25455 of Airfiber Inc is a good exhibit of some recently discovered concepts in FSO in accordance with the prior art, and is here cited as reference.

In cellular communication the line of sight problem is also encountered sometimes at high frequencies, and active repeater antennas are used to direct the radiation fields to areas where radio coverage is obstructed by an obstruction such as a building, rock etc. One alternative design for an active repeater antenna is exhibited in WO 01/17059 by Teligent Inc, which is cited here as reference.

The active repeaters have many shortcomings if applied to FSO links. The signal needs to be converted from optical to electrical and thus reduces the speed of the network. Prior art repeaters are also designed for a particular wavelength, i.e. they are dispersive. Power chords are also tedious to install to a network that has short connections, in the order of hundreds of meters.

The most obvious passive repeater at short wavelengths would of course be a mirror. However a mirror is difficult to design, difficult to focus, and mechanical drift very easily pushes the mirror from focus to out of focus, thus disrupting the link.

On the other hand telescopes have been known to transmit very parallel beams, by the process of beam expansion. For example, a telescope with an aperture of 1 m has been known to transmit a laser beam to the moon, with a diameter of 1 kilometer. (*Optics and Photonics*, F. Graham-Smith, T. A. King 2000). Further, U.S. Pat. No. 5,627,669: Optical transmitter-receiver, features a transmitter receiver where a beam expander has been integrated to provide a general small capacity optical communication within a short distance. Lucent Technologies has demonstrated telescopes in FSO systems in their WWW journal "Bell Labs Trends & Developments, Jun. 22, 2001." Telescopes and beam expanders can be used to minimise divergence, but they do not reduce the attenuation of the beam.

SUMMARY

The invention under study is directed towards a system and a method for effectively transmitting, repeating, routing and receiving light and IR/microwave beams between primary transmitters and receivers even when there is bad weather, no line of sight connection between them or they are too far apart.

One aspect of the invention boosts the range of current optical connections significantly, by reducing attenuation as well as divergence. In the invention the attenuation spectrum is recorded from the optical path between the transmitter and the receiver, i.e. the optical path of communication. When the communication wavelengths are selected according to this spectrum that takes into account the heterogenity of the atmosphere, the minimum absorption wavelengths are selected efficiently.

Another aspect of the invention allows the connections to circumvent line of sight obstructions efficiently. The passive repeater of the invention focuses radiation to a waveguide that can be kinked to redirect the beam. The beam need not be amplified, the design can be made non-dispersive to accommodate a broad band of wavelengths, and the arrangement is far more resistant to mechanical drift than a mirror. The active repeater of the invention is different and preferable in the aspect that it is also non-dispersive and can accommodate several wavelengths that are typically demande by the invention.

By installing and employing the system and method of the invention, it is possible to realise optical and IR connections between two obstructed locations that could also be very far apart. The present invention allows the provision of high bandwidth communication connections to very complex and presently technically or economically unreachable locations. The inventive method to route light or IR-beams to these destinations is both technically easy to implement on site and affordable.

According to one aspect of the invention, more reliable and efficient optical fixed wireless broadband access is provided to buildings with light beams and devices in accordance with the invention.

According to another aspect of the invention, more affordable terrestrial wireless long-distance communication connections are realised with light beams and devices in accordance with the invention.

"Light", "optical" and "radiation" here refers to light and radiation that is not limited to the visible or IR band, but consists of the band from UV to high frequency radio, or radiation of any frequency where frequency dependent attenuation by the transfer medium is significant.

In addition and with reference to the aforementioned advantage accruing embodiments, the best mode of the invention is considered to be the application to wireless broadband communication and access.

In the present best mode of the invention, the signals are processed optically at every opportunity. In the present best mode of the invention, a portion of the transmitted radiation from the transmitter to the receiver is reflected back with a retroreflector for optical feedback. The attenuation spectrum is deduced from this optical feedback, and the optical feedback can also be used for alignment.

BRIEF DESCRIPTION OF THE DRAWINGS

In the following the invention will be described in greater detail with reference to exemplary embodiments in accordance with the accompanying drawings, in which FIG. 1 demonstrates a typical near IR intensity spectrum.

Some of the embodiments are described in the dependent claims.

DETAILED DESCRIPTION OF EMBODIMENTS

Figure 1:
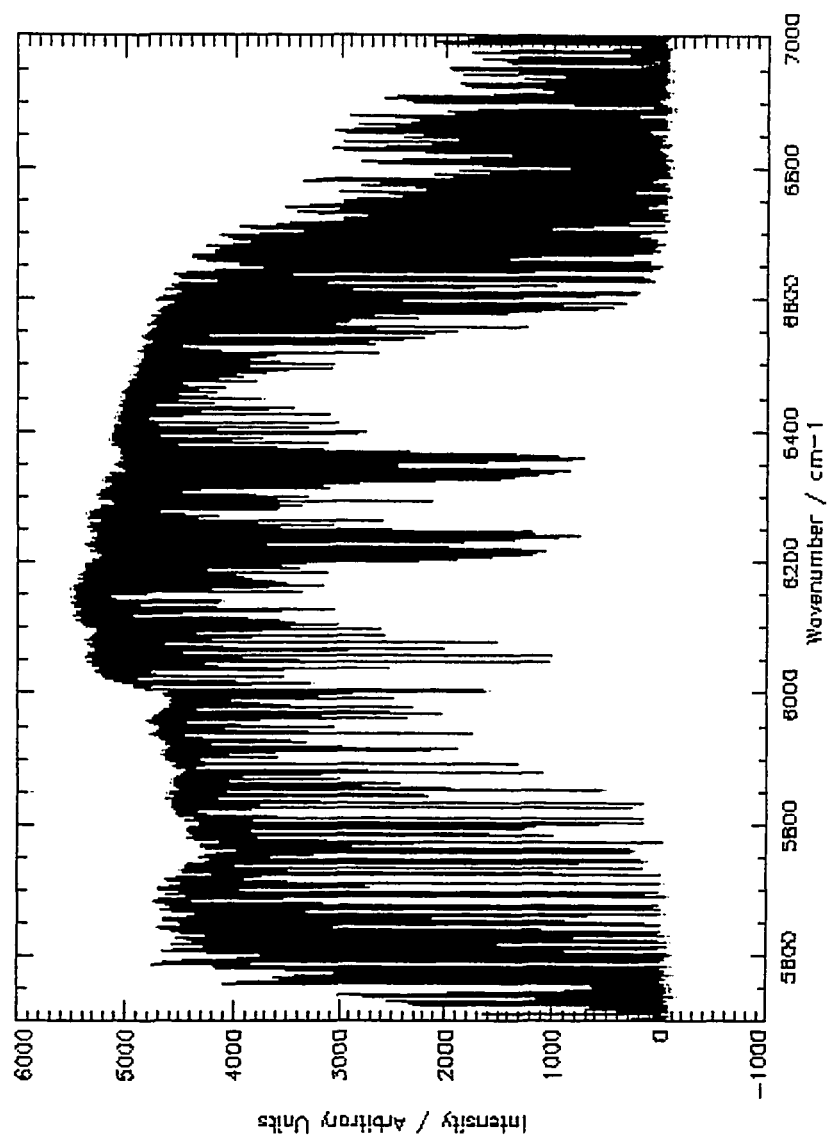
FIG. 1A demonstrates an embodiment of a transmitter 10 in accordance with the invention.
FIG. 1B demonstrates an embodiment of a receiver 11 in accordance with the invention.
FIG. 1C demonstrates an embodiment of the spectral scanning process 19 in accordance with the invention.

FIG. 1 displays a typical near IR intensity spectrum for atmospheric transmittance due to solar radiation. The intensity is shown on the vertical axis as arbitrary units, and the wavenumber is shown on the horizontal axis. As is evident, there are huge variations in the intensity detected at various wavelengths. This is primarily because most of the absorption takes place at wavelengths that are at resonance frequencies of molecules in the air. Especially water vapour plays an important role in the radiative processes of the atmosphere, which is reflected in the heavy attenuation that an optical link suffers at times of rain, fog, mist or snow. Near a resonance the absorption is high, and therefore it is important to chart those frequencies where resonances do not occur, and use them for communication.

FIG. 1 shows only a limited band, but it is known from literary sources, for example from *Introduction to Astronomy, Tähtitieteen perusteet, Ursa,* 1995, that the entire band from visible ($\lambda$=800-1300 nm) to short wavelength radio ($\lambda$=10 mm) is troubled by turbulent atmospheric attenuation. It is known and recent investigations have revealed that the attenuation spectrum in a given optical path is unique and dynamically changing.

The differences in intensity and thus absorption may be several orders of magnitude, and thus a correct choice of frequencies may improve the intensity and range of an optical or near IR communication link significantly, or by even several orders of magnitude.

Figure 1A:
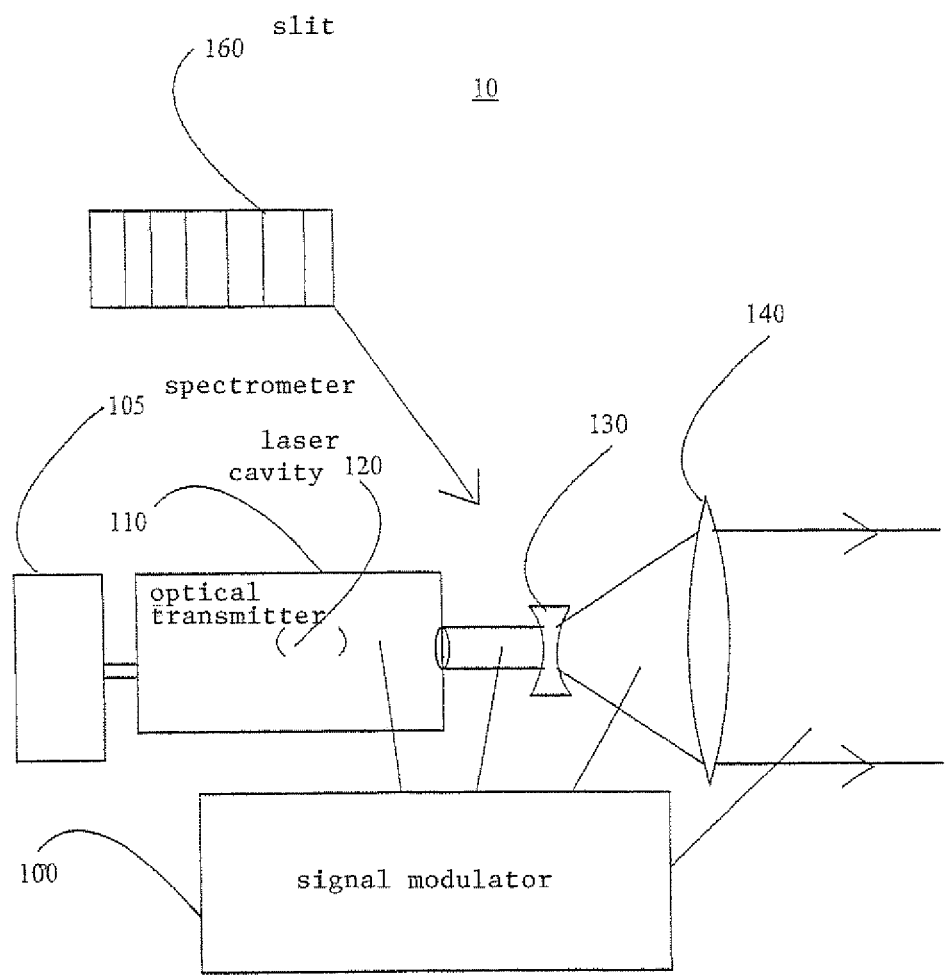

FIG. 1A exhibits an optical transmitter arrangement 10 in accordance with the invention, in which the light or IR radiation is generated in the optical transmitter 110. The light is typically laser light, and may be generated by an LED (Light Emitting Diode), any semiconductor laser, or any other lasing material, for example by a gas in a lasing cavity 120. The optical transmitter 110 may be for example a theodolite- or a helium-neon laser, ruby laser, Nd:Yag laser, $CO_2$-laser, GaAs laser, AlGaAs laser, any quantum cascade laser, or any other laser or maser or a conventional light source in accordance with the invention. Typically the optical transmitter 110 may transmit UV light-, visible or invisible light, near IR, far IR, or IR-beams at varying frequencies.

In some embodiments, the transmitter 10 comprises also a spectroscope 105. The spectroscope is arranged to scan a broad band of feasible transmission wavelengths and measure the atmospheric absorption at these wavelengths. The spectroscope is arranged to detect the minimum absorption frequencies, as these typically are the best wavelengths for communication as they attenuate the least. The optical transmitter 110, the beam expansion systems 130, 140 and the signal modulator 100 are then arranged to use this minimum wavelength as the transmission wavelength.

The spectroscope records spectral absorption in open air. The spectrometer 105 may use a reference beam, which may be a conventional light beam also in addition to a laser, or it may use the carrier beam itself to sweep through the band to obtain spectral data. The detection of the spectrum may be arranged at the receiver end, or a portion of the incident radiation is reflected back with a retroreflector and the spectrum is deduced from the optical feedback. In some embodiments one spectroscope may be shared among several transmission systems, or several spectrometers may be used to provide spectral data and measurements to a particular beam transmission system. The spectrometer 105 may also be realised as a separate device, and the spectral measurements may be communicated to at least one transmission system through a separate communication connection. Likewise the transmitter system 10 or the spectrometer 105 may establish a communication connection to the receiver or vice versa to communicate transmission frequencies used and/or measurement data. This communication connection may be a radio connection, for example a GSM-, GPRS-, UMTS-, or any satellite radio connection.

In some embodiments the transmitter uses several wavelengths that are chosen on the basis of an algorithm that minimises the attenuation and the divergence at these wavelengths, based on absorption data and the divergence effects at those wavelengths.

For example typically the divergence angle of a Fraunhofer diffracted beam for the $TEM_{00}$ mode with a Gaussian spatial profile is $\theta = \lambda/\pi w_0$. Thus the divergence angle grows with wavelength. Then it is desirable to choose a short wavelength, with a small absorption.

Naturally the light source 110 may also be a conventional non-lasing light transmitter. In one embodiment, a communication signal is modulated into the light signal after it has been generated by the communication signal modulator 100. The light signal leaves the optical transmitter and is focused to a diverging lens 130, after which the beam or some portion of it is diverged onto a converging lens 140 that collimates the incident rays. The array of lenses 130 and 140 constitutes a beam expander, which is designed to expand the beam width, collimate the rays and reduce angular divergence. For example, a survey theodolite laser expanded to a beam waist of 25 mm has practically a parallel beam to distances of 3 km and beyond. This is a sufficient distance to connect several buildings by an optical communication connection.

In some embodiments the invention incorporates several arrays of beam expanding lens systems (130, 140) in series. In some embodiments the transmitted light is diffracted by a slit 160 to produce several identical redundant rays, and in some embodiments the optical transmitter arrangement comprises several parallel beam expander arrays for the redundant beams. Redundancy is desirable when the receiver can receive the redundant rays. By redundancy the signal quality is improved.

In some embodiments the transmitter arrangement 10 can accommodate many wavelengths of transmission signals that can be quite different. In order to achieve this the lens systems are typically eliminated or compensated for dispersion, aberration or other defects associated with operating at a multitude of wavelengths. The inter-lens distances and the lens radii and thickness are adjustable in some embodiments. Likewise the optical transmitter 110 is typically tunable to a range of wavelengths in some embodiments, or there may be several optical transmitters 110 designed to operate at various wavelengths or ranges. The transmitter 110 may transmit optical, IR and/or microwave radiation. The optical transmitter 110 may be arranged as a matrix of lasers spaced a few nanometers a part. The individual lasers all scan a band of few nanometers so that the matrix is capable of transmitting on a broad band. Tuning can be thermal by Peltier elements or the like in some embodiments.

Figure 1B:
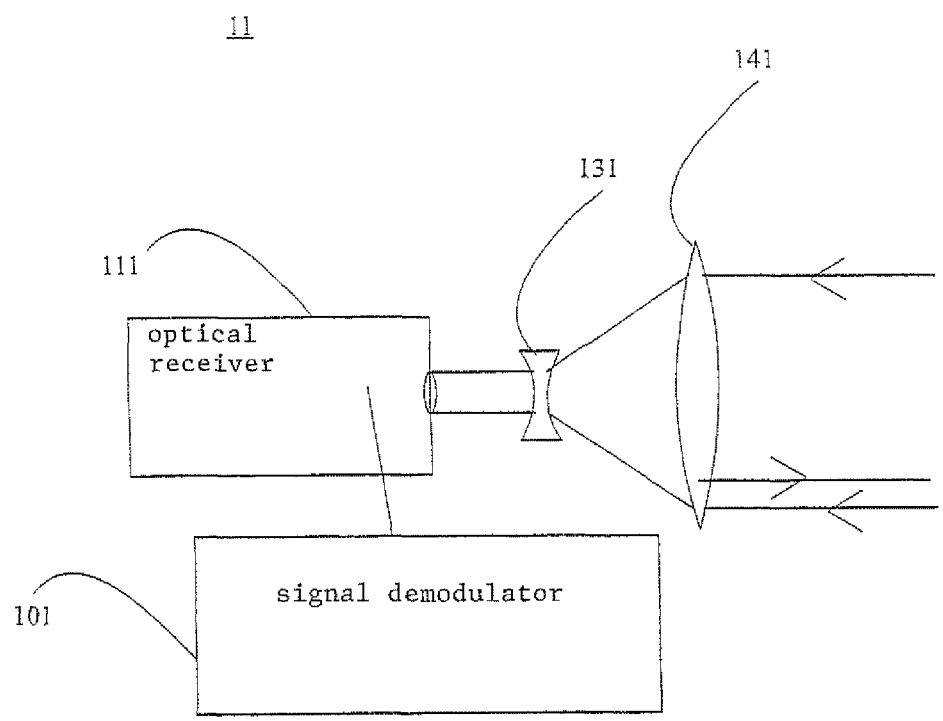

FIG. 1B exhibits an optical receiver arrangement 11. The incident beam is compressed by the beam compression lens array (131, 141). The incident beam is first focused by the converging lens to the diverging lens 131 that collimates the incident rays. The rays are then focused on the optical receiver 111. The optical receiver 111 may be any light detector such as a photodiode, an avalanche photodiode APD or any CCD (Charge Coupled Detector) Device. The signal demodulator 101 is arranged to demodulate the communication signal from the optical receiver signal.

In some embodiments, several optical receiver systems and optical beam compression systems (131, 141) may be realised in parallel to receive redundant beams, reference beams or other beams. Likewise in some embodiments several arrays of beam compression systems (131, 141) may be arranged serially to provide strong and exact compression. In some embodiments several optical receiver systems 111 may be realised to detect rays emerging from a particular beam compression system (131, 141), or vice versa several beam compression systems (131, 141) may be arranged to feed signals to a particular optical receiver system (111). The optical receiver system (111) typically also deduces the attenuation spectrum of the optical path, in embodiments where the spectrum is deduced at the receiver end. The lens 141 or optical input aperture typically also comprises a retroreflector portion, that is used to reflect a portion of the incident light back to the transmitter for the purposes of deducing the absorption spectrum.

In some embodiments the receiver arrangement 11 can accommodate many wavelengths of transmission signals that can be quite different. In order to achieve this the lens systems are typically eliminated or compensated for dispersion, aberration or other defects associated with operating at a multitude of wavelengths. The inter-lens distances and the lens radii and thickness are adjustable in some embodiments. Likewise the optical receiver 111 is typically tunable to a range of wavelengths in some embodiments, or there may be several optical receivers 10 designed to operate at various wavelengths or ranges. The transmitter 10 and the receiver 11 may also employ communication links between each other to choose suitable frequencies to which the beam(s) may be tuned. The receiver 111 may receive optical, IR and/or microwave radiation.

In some embodiments the optical transmitter 10 and receiver 11 are realised in the same unit to establish an active optical transceiver unit.

Figure 1C:
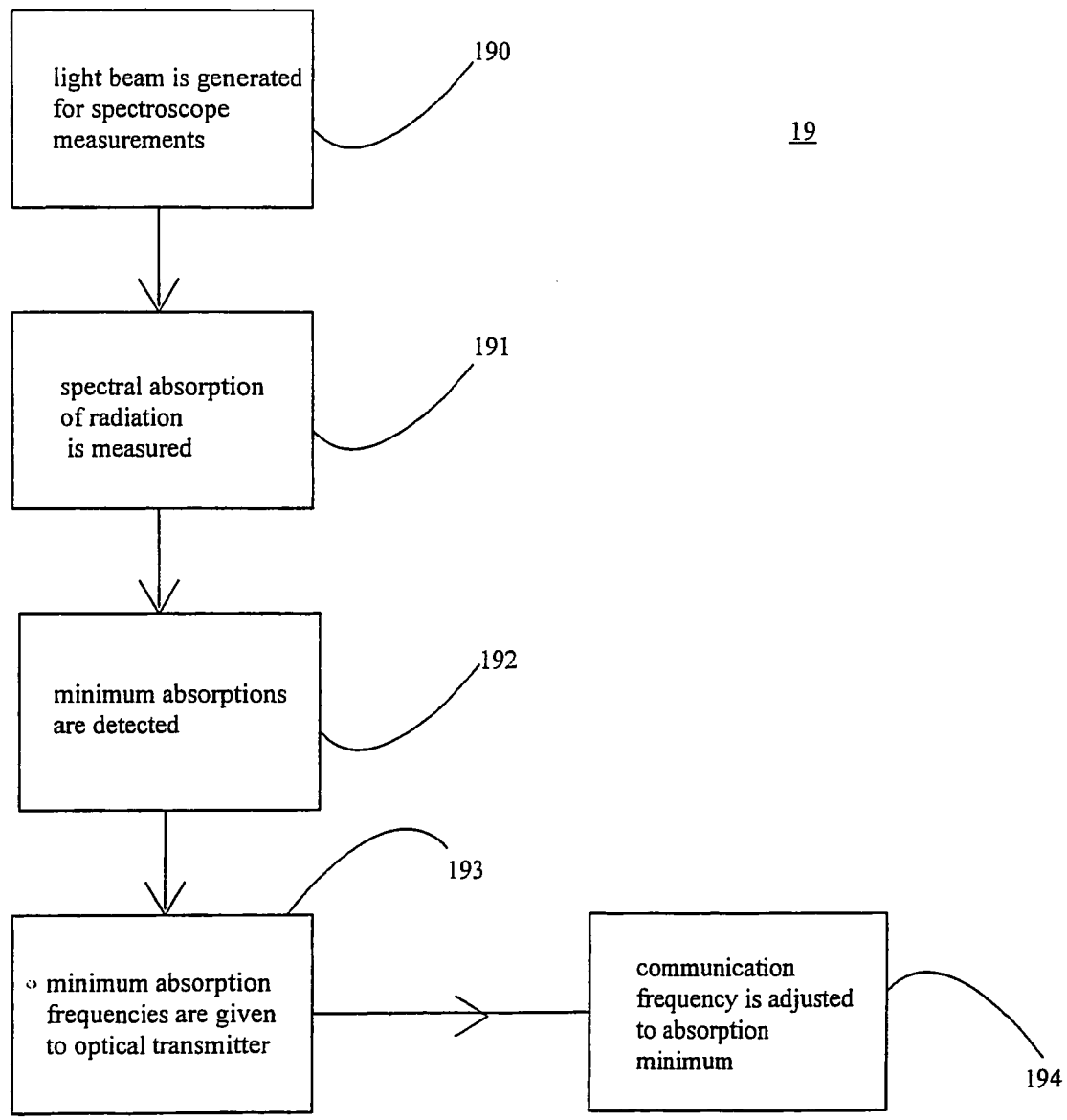

FIG. 1C demonstrates a spectral scanning method 19 in accordance with the invention as a flow diagram. In phase 190 light beam is generated for spectral measurements. The spectroscope records spectral absorption in open air over the path of optical communication and uses a reference beam or the carrier beam itself, depending on the design of the spectrometer. In phase 191 the spectral absorption of radiation is measured, typically across the visible, near-IR, IR or microwave bands. In some embodiments UV bands may also be possible. However, the use of UV light may be restricted in some embodiments due to health concerns.

In phase 192 the minimum absorptions are detected. In some embodiments, several frequencies with a low absorption, or a range of wavelengths under a threshold absorption may be detected. Detection is either performed at the receiver from the incident radiation, a white light pulse, reference beam or the like, or at the transmitter from the retroreflected radiation. In phase 193 the minimum absorption frequencies are communicated to the optical transmitter, or any computing device arranged in association with the optical transmitter. In phase 194 the transmission frequency is adjusted to absorption minimum. In some embodiments the transmission frequencies are adjusted to minimise both divergence and attenuation.

In some embodiments transmitters 10 and receivers 11 are arranged to communicate spectral data or frequencies to one another through radio communication or other communication in some embodiments. This communication connection may be a radio connection, for example a GSM-, GPRS-, UMTS-, or any satellite radio connection.

It is clear that several wavelengths can be used in a wavelength division multiplexing fashion, to communicate redundantly in order to reduce the error rate or to provide several parallel communication channels.

Figure 2:
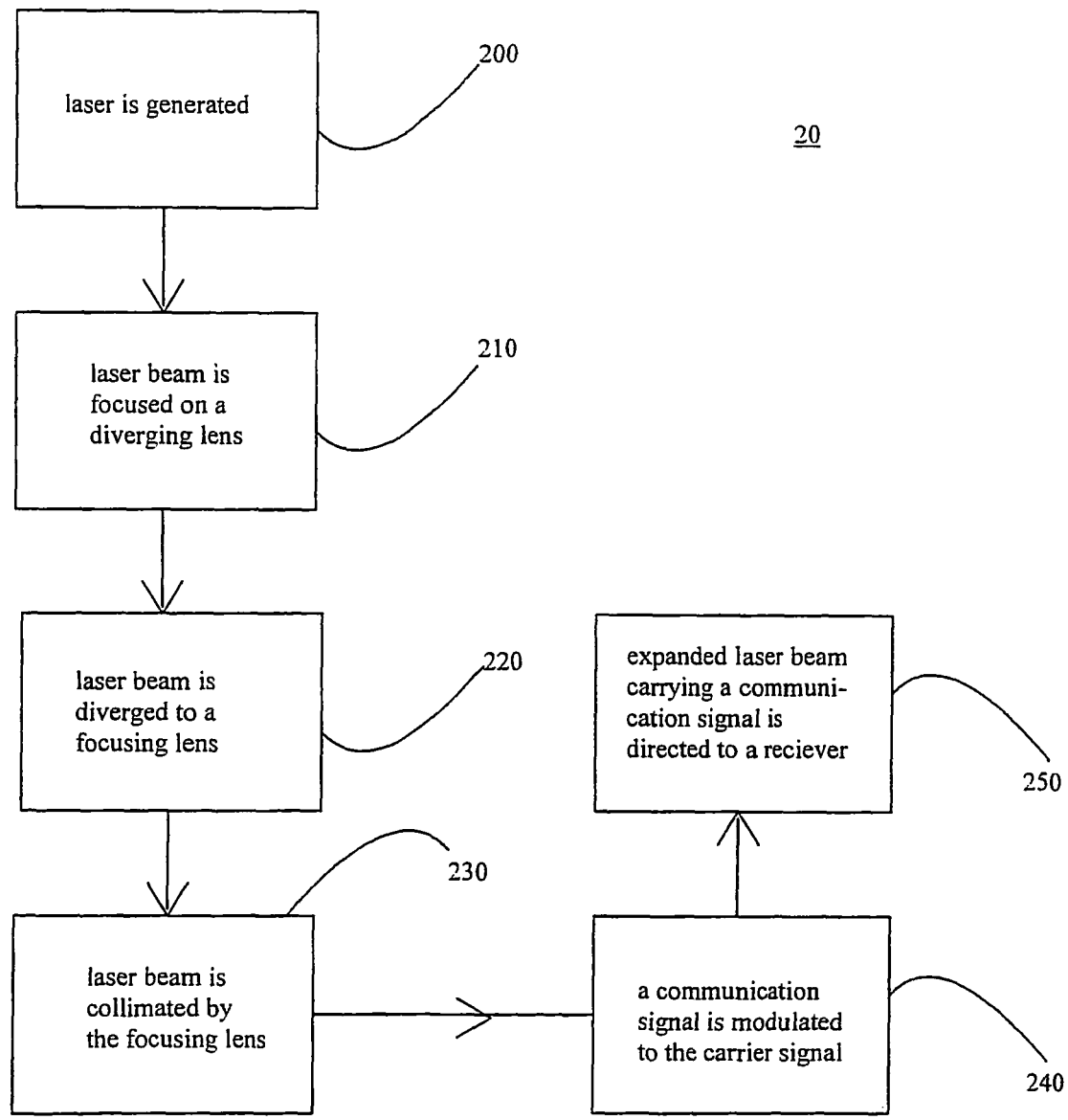
FIG. 2 demonstrates an embodiment of the transmission process 20 in accordance with the invention as a flow diagram.

FIG. 2 exhibits a transmission process 20 in accordance with the invention, in which the laser or maser is generated in phase 200. In phase 210 the laser is focused on a diverging lens. In phase 220 the laser beam is diverged from the diverging lens to the focusing lens. The diverged laser beam is collimated by the focusing lens in phase 230. Phases 220 and 230 are used to expand the beam in order to collimate the beam and minimise its divergence, and may be repeated several times in order to achieve the desired beam expansion and parallel propagation distance. In phase 240 a communication signal is modulated to the carrier signal. In some embodiments the phase 240 may take place later or earlier, for example before, concurrently or after any of the phases 200, 210, 220, 230, 250. It is clear that non-dispersive optical components need to be used in the system so that the phases 200, 210, 220, 230, 250 may be executed at various wavelengths with the same equipment.

The communication signal may be for example a OC-3C, STM-1, OC-12C-, STM 4-, Ethernet-, SONET-, SDH-, SS7-, GSM-, H323-, HTRP-, UMTS-, WAP-, Teldesic-, Inmarsat-, Iridium-, GPRS-, CDMA-data, WCDMA-data, email-LAN-, TCP/IP-, UDP-, POTS-, PDC-, NDC-, imode-, Globalstar- and/or WLAN-signal in accordance with the invention. The optical link and the communication signal are typically used to connect buildings to a MAN (Metropolitan Area Network) or any other backbone network in order to provide efficient Internet-, data- and/or telephony services. In some embodiments it is used to provide a backhaul network for example to base stations or radio transceivers of any radio network, cellular network or television and/or radio broadcast system.

In phase 250 the expanded laser beam carrying a communication signal is directed to a receiver or an optical transceiver. The receiver or transceiver may be located anywhere within the line of sight and operation range of the transmitter. With a strong enough expander, for example a powerful telescopic expander transcontinental communication links can be provided in order to replace the use of marine cables, satellites or radio links.

In, before, during or after any of the phases the power of the laser generated may be controlled to achieve an optimum communication link. A communication link operating at optical or IR-wavelengths may carry hundreds or even thousands of Megabits per second per beam in accordance with the invention. It is clear that any of the phases of the spectral scanning process 19 and transmission process 20 may be interleaved in accordance with the invention, i.e several transmission frequencies may be changed dynamically in accordance with attenuation spectrum data.

Figure 2B:
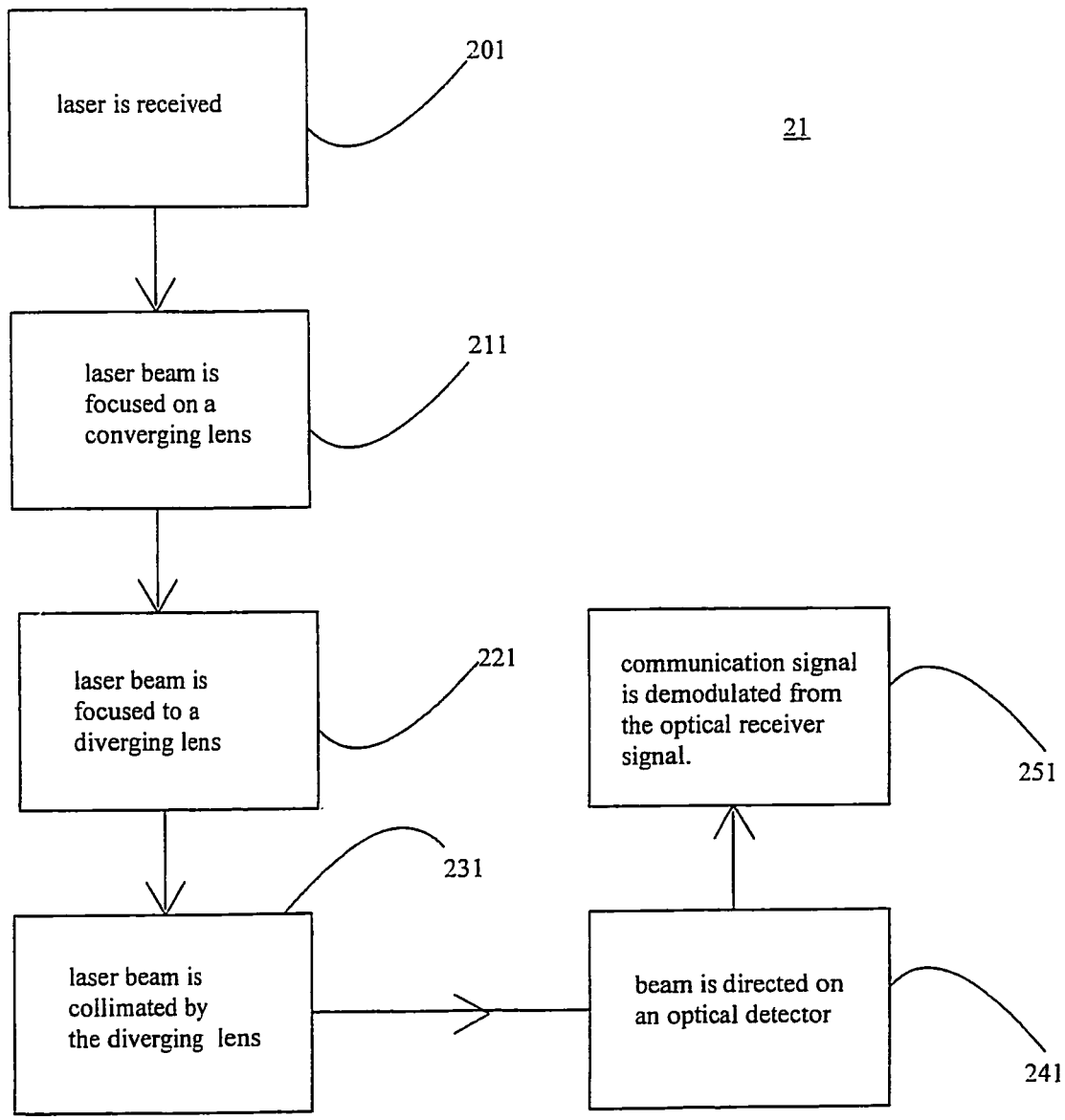
FIG. 2B demonstrates an embodiment of the reception process 21 in accordance with the invention as a flow diagram.

In FIG. 2B a reception process in accordance with the invention is described as a flow diagram. In phase 201 the laser is received. In phase 211 the laser beam is focused on a converging lens. In phase 221 the laser beam is focused from the converging lens to a diverging lens. In phase 231 the laser beam is collimated by the diverging lens. The phases 211, 221, 231 may be repeated in sequence several times in some preferable embodiments in order to compress the beam more than would be possible by a single lens array. In phase 241 the beam is directed to at least one optical detector. The optical detector may be any light detector such as a photodiode, an avalanche photodiode APD or any CCD (Charge Coupled Detector) device, or any other photodetector. In phase 251 a communication signal is demodulated from the optical receiver signal. In some embodiments several communication signals may be demodulated from the signal, and the demodulation may take place before, after or concurrently with any of the phases 201, 211, 221, 231, 241, 251.

In some embodiments the lens systems, transmitters and receivers are adaptable for a range of wavelengths i.e. they are non-dispersive, as the minimum attenuation wavelength by the material, i.e. air is probed with a spectrum of wavelengths in order to establish an optimum optical link.

In some embodiments the lens systems 130, 131, 140, 141 may comprise other optical devices such as mirrors or parabolic and/or concave mirrors along with lenses or without in order to achieve the desired beam focusing, direction, expansion and compression. It is clear that any of the phases of the spectral scanning process 19 and reception process 21 may be interleaved in accordance with the invention.

Figure 2C:
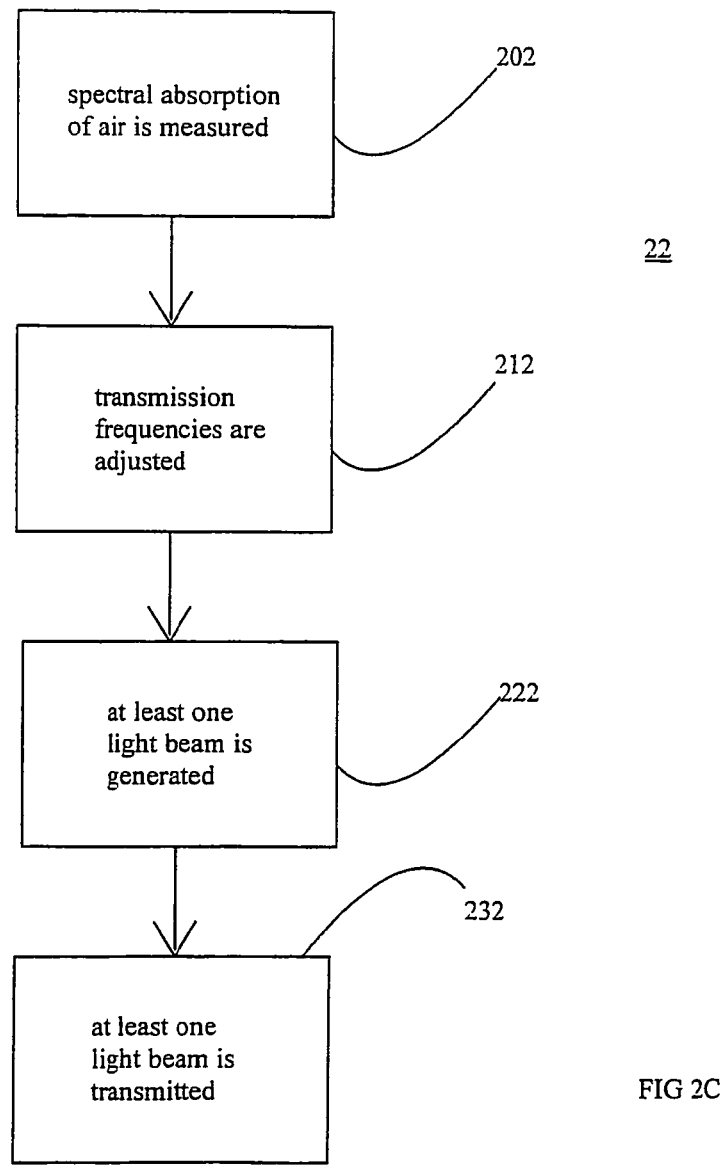
FIG. 2C demonstrates an embodiment of the transmission and spectral scanning process 22 in accordance with the invention as a flow diagram.

FIG. 2C displays a method 22 for combining the spectral absorption determination and beam transmission in accordance with the invention. In phase 202 the spectral absorption of air is measured from the path of optical communication by a light pulse of several wavelengths, by scanning the path with a variable wavelength beam or with the carrier beam itself or a reference beam. Spectral detection may be at the receiver end or at the transmitter when the spectrum is detected from the retroreflected feedback. In phase 212 the transmission frequencies are typically adjusted to minimise divergence and attenuation. In phase 222 at least one light beam is generated to enable optical communication. In phase 232 at least one light beam is transmitted to a receiver, which is typically a wireless broadband communication receiver or transceiver.

Figure 2D:
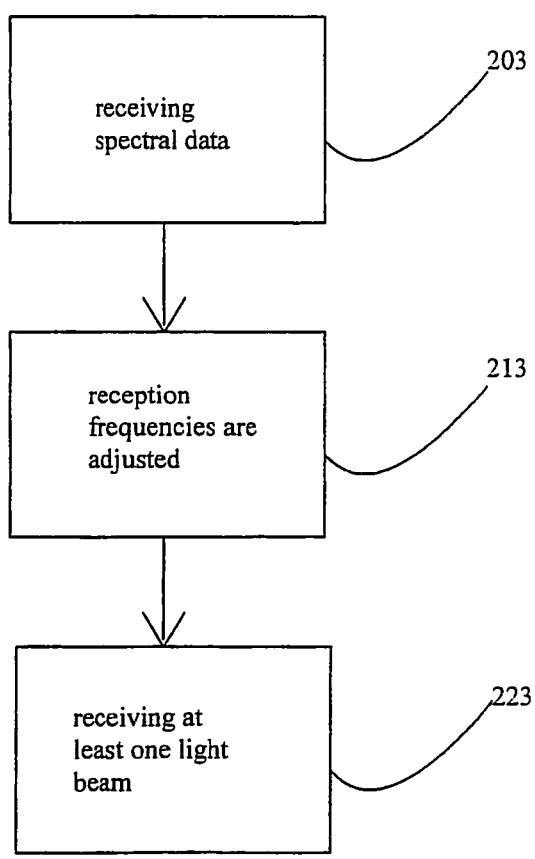
FIG. 2D demonstrates an embodiment of the reception and spectral scanning process 23 in accordance with the invention as a flow diagram.

FIG. 2D displays a method 23 for combining the spectral absorption determination and beam reception in accordance with the invention. In phase 203 spectral data is obtained or measured from the path of optical communication by a light pulse of several wavelengths, by scanning the path with a variable wavelength beam or with the carrier beam itself or a reference beam. In phase 213 the reception frequencies are adjusted accordingly, typically in order to minimise divergence and attenuation. In phase 223 at least one light beam is received.

It is clear that both methods 22 and 23 may be ran in a dynamic fashion, i.e. frequency hopping is continuous to those frequencies that are preferable in terms attenuation, divergence or other factors.

Figure 3:
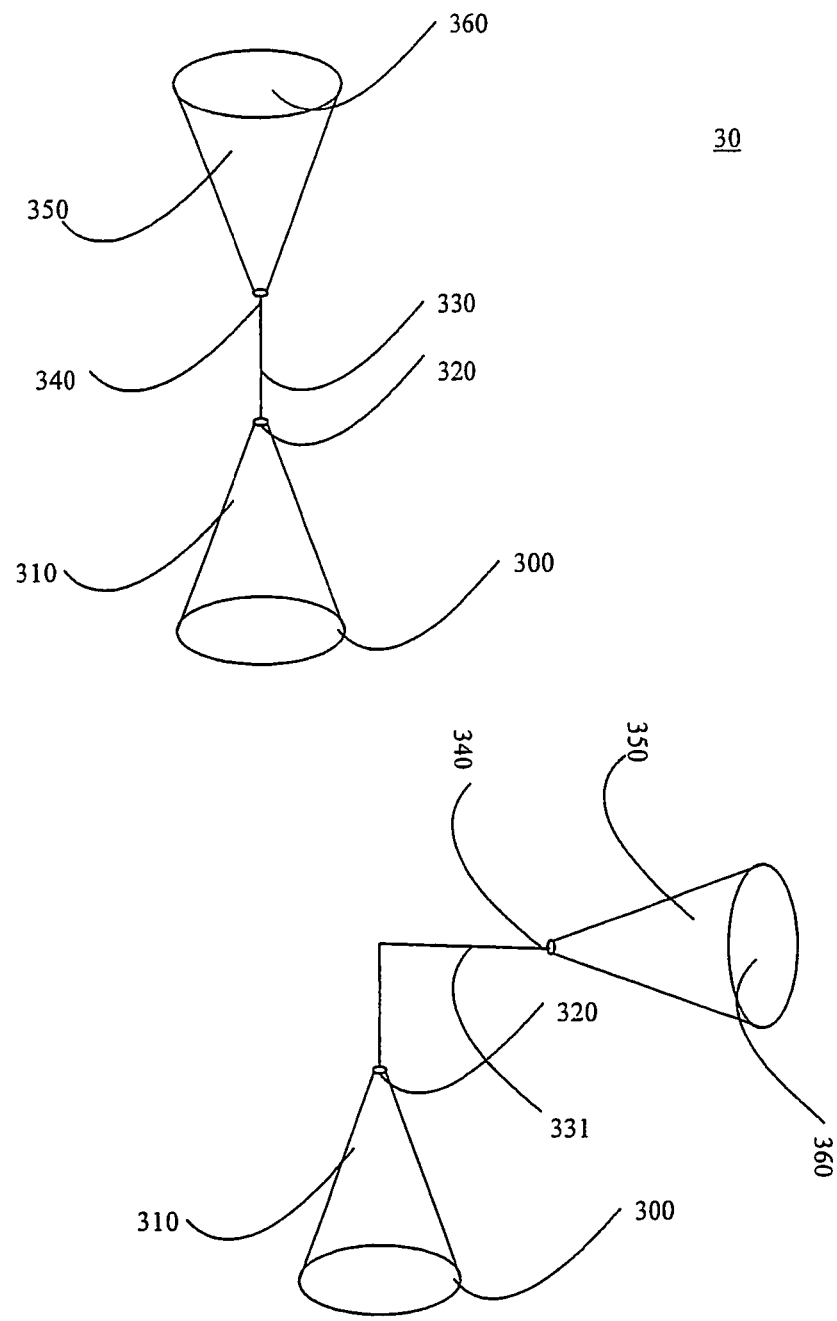
FIG. 3 demonstrates an embodiment of a passive beam reception and routing device 30 of the invention.

FIG. 3 shows an all-optical passive transceiver 30 in accordance with the invention. In some embodiments a light beam hits the lens 300, from which it enters a reflective cone 310. The lens 300 focuses the beam to the waveguide interface 320, which may also comprise another lens. The beam or some portion of it is arranged to enter the waveguide 330, which may be of varying shapes. The beam exits the waveguide 330 to the interface 340 and then to the cone 350. The beam is then focused by the lens 360 to a further receiver or a further transceiver. In some embodiments the transceiver 30 is bi-directional, beams may be passed from lens 360 to 300 and vice versa.

The waveguide 330, 331 may be kinked, curved or straight in order to bend and redirect the beam to overcome line of sight obstacles. The waveguide 330, 331 is made of optical fiber, glass fibre or a hollow reflective tube in some embodiments. The wave guide typically has a cladding that prevents the diffusion of rays from the waveguide except from the ends by total internal reflection or otherwise. In some embodiments the waveguide 330, 331 is made of Erbium doped, or otherwise doped optical fiber.

The transceiver 30 is typically all-optical, i.e. the signal is not modified to an electrical signal at all. This allows uninterrupted communication at the speed of light. In addition the transceiver is typically also passive, i.e. it does not require a power source. In order to deploy the transceiver in accordance with the invention one simply needs to place it in a position and location from which it has a line of sight connection to at least one transmitter and at least one receiver or at least one transceiver. As stated earlier, the optical transmitter 10 in accordance with the invention may produce a parallel beam of several kilometers in length, By employing a group of transceivers 30 in accordance with the invention, it is possible to provision one beam to several residential buildings in a range of few kilometers in order to provide Wireless Broadband Access. It is desirable that the elements of the transceiver are non-dispersive, in order to accommodate a broad rage of wavelengths. It is also clear that the transceiver 30 may comprise lens systems 300, 360 for collimation, beam expansion and compression and focusing optics in order to direct the beams accurately between the nodes between which it is relaying signals.

Figure 3B:
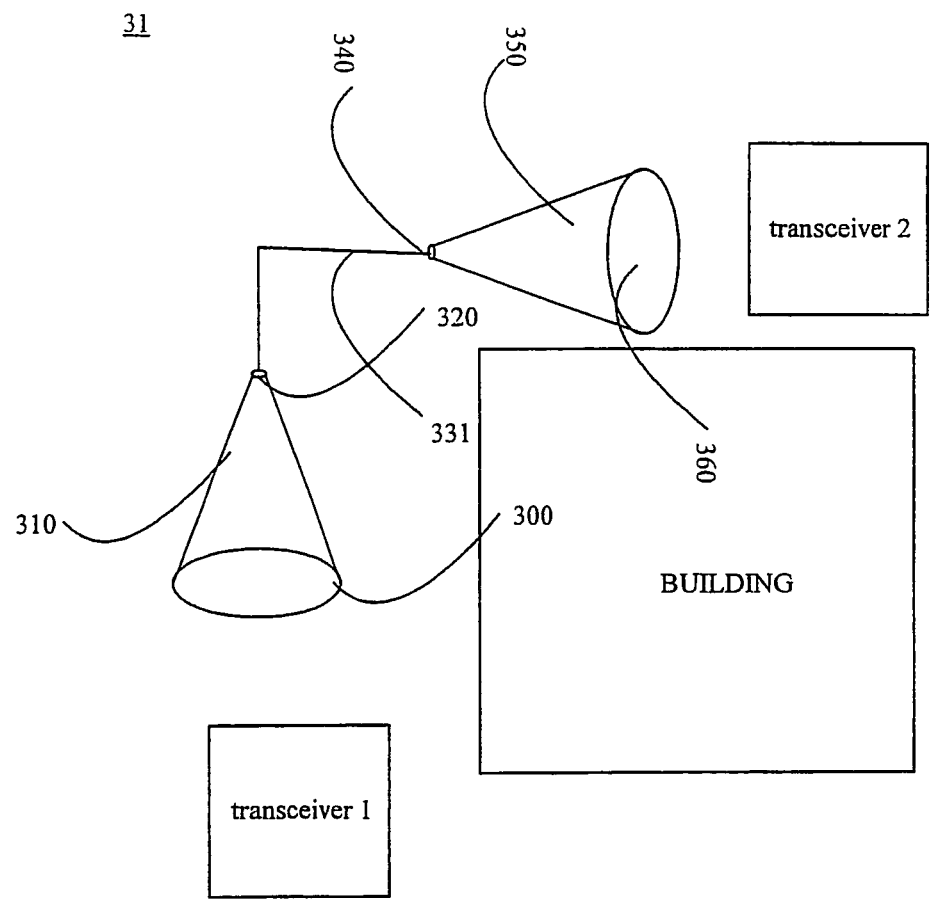
FIG. 3B shows an exemplary use scenario 31 of a passive beam reception and routing device 30 of the invention.

FIG. 3B shows how the passive transceiver can be used to realise a previously impossible communication connection between transceivers 1 and 2 that were obstructed by the building. It is clear that with arrays of passive transceivers in accordance with the invention long beams can be provisioned to different topologies of buildings or landscape.

Figure 4:
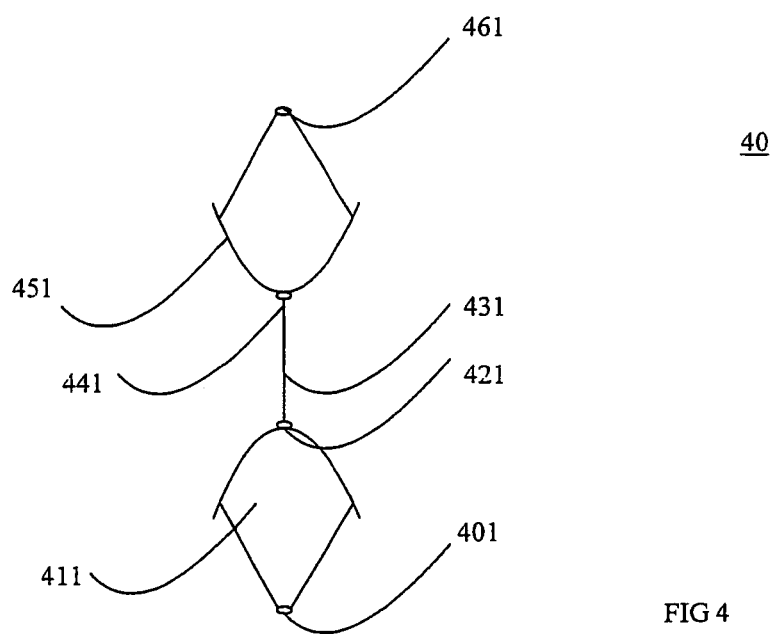
FIG. 4 demonstrates an embodiment of a passive beam transceiver device 40 of the invention.

FIG. 4 shows an alternative arrangement for an all-optical passive transceiver. In this embodiment incident radiation is focused by a parabolic mirror 411 onto a semisilvered reflective mirror 401. This mirror is then arranged to reflect the focused radiation to the waveguide interface 421, and the focused radiation is arranged to enter the waveguide 431 from the interface 421. The waveguide 431 is made of optical fiber, glass fibre or a hollow reflective tube in some embodiments, and the radiation exits it through interface 441. The interfaces 421, 441 also typically comprise lenses, and the interface 441 is typically arranged to focus the radiation to the permeable portion of the semisilvered mirror 461, and ultimately a further receiver and/or transceiver. In some embodiments the transceiver is unidirectional, in other embodiments bi-directional as beams may be passed from mirror 461 to 401 and vice versa. It is also desirable that the elements of the transceiver are non-dispersive, in order to accommodate a broad range of wavelengths.

In some embodiments the passive all-optical transceivers 30 and 40 are applicable for other uses in addition to relaying short wavelength broadband signals. The transceivers 30 or 40 may also be implemented inside to carry optical or IR-signals from remote controls or other devices to target devices, such as TV, dishwasher or radio for example that are arranged to communicate with the said other devices. In fact communication wiring can be replaced by the use of optical beams that are relayed by the said transceivers 30 and 40 in many scenarios: factories, offices, residential buildings etc. In some embodiments the transceivers 30 and 40 also comprise an array of lenses for beam compression or expansion. In some embodiments diffraction slits may be used to make redundant copies of the incident beam in the transceiver 30, 40 for further transmission. Likewise, the transceiver 30, 40 may in some embodiments receive sets of redundant beams and focus these beams on the waveguide 330, 431.

Figure 5:
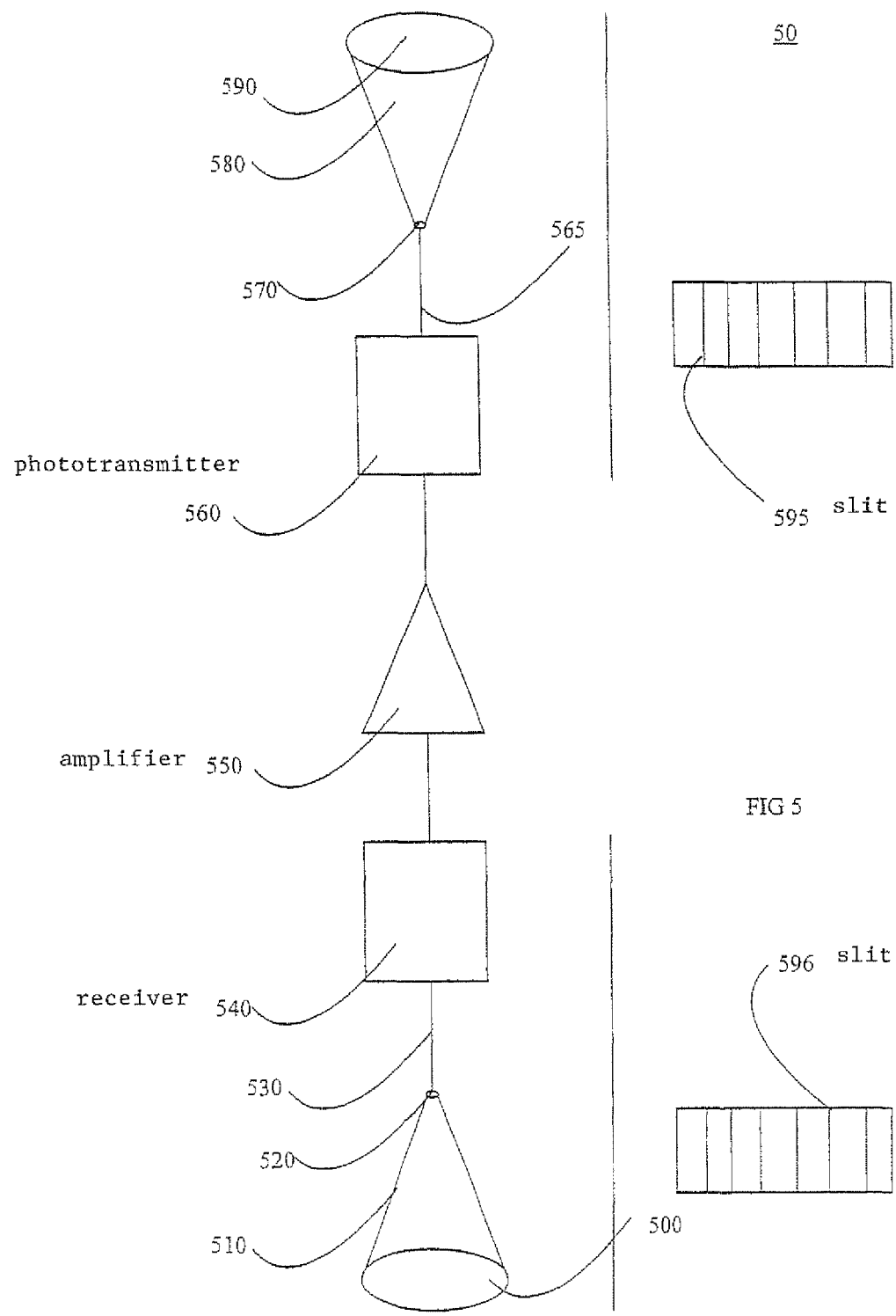
FIG. 5 demonstrates an embodiment of an active beam routing device 50 of the invention.

FIG. 5 submits an exemplary unidirectional active optical transceiver 50 in accordance with the invention. The lens 500 is arranged to focus the incident through the cone or reflective cone to the waveguide interface 520. After interface 520 the radiation is arranged to enter the waveguide 530. The radiation 540 is received by the photoreceiver 540, which may be a photodiode, an avalanche photodiode APD or any CCD (Charge Coupled Detector) device, or any other photodetector. In some embodiments the receiver 540 incorporates amplification, for example typically in the case of an APD. However in some embodiments the receiver signal is amplified by the amplifier 550, which is typically an operational amplifier in some embodiments. The amplified signal is fed into the phototransmitter 560. The phototransmitter is typically an identical transmitter to the transmitter that transmitted the incident radiation on the transceiver 50. However in some embodiments the phototransmitter is a theodolite- or a helium-neon laser, ruby laser, Nd:Yag laser, $CO_2$-laser, GaAs laser, AlGaAs laser, any quantum cascade laser, or any other laser in accordance with the invention. The transmitting end is arranged to direct the lens so that it directs and refocuses the amplified radiation to a further receiver or a further transceiver. The features in FIG. 5 include a beam directing device 510, a waveguide interface 570, and beam directing devices 580, 590.

In several embodiments redundancy of the beam is a desirable feature for the transceiver. The transceiver 50 may be equipped with diffraction slits 595, 596 in order to diffract copies of the original beam before, during or after the detection-amplification-transmission process. In some embodiments the waveguide portions 530, 565 may be variable in length and also kinked, curved or of various shapes in order to direct the relayed beams in the desired direction and fashion.

Figure 6:
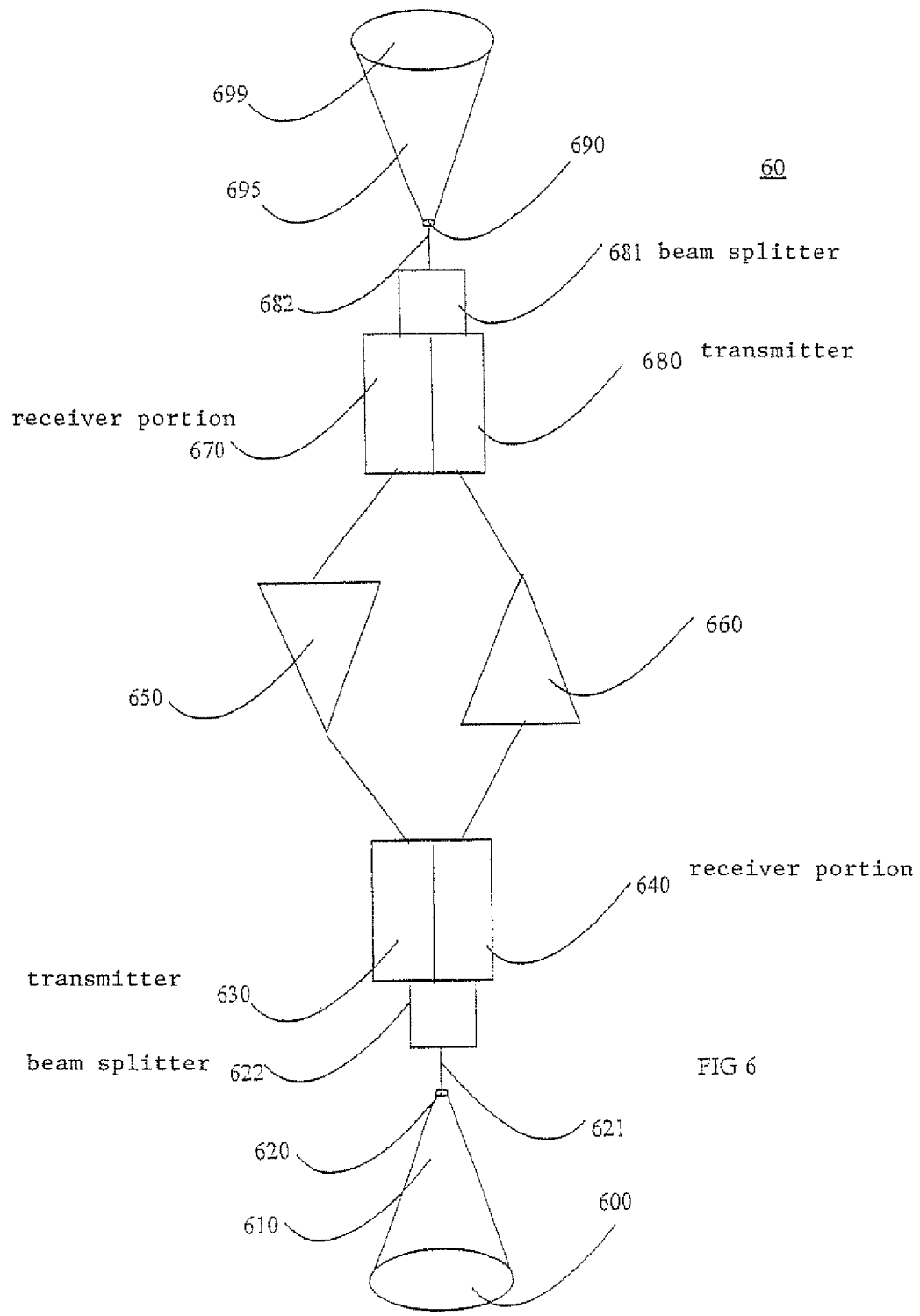
FIG. 6 demonstrates an embodiment of an active bi-directional beam routing device 60 in accordance with the invention.

FIG. 6 submits an exemplary embodiment of a bi-directional active optical transceiver. The difference to transceiver 50 is that the waveguides 621, 682 are interfaced with beam splitters 622, 681 for the beams traversing in two directions. The beam splitters are designed to direct the incoming unamplified beams to the receiver portions 640, 670. Respectively the outgoing amplified radiation transmitted by the transmitters 680, 630 is allowed to enter the waveguides 682, 621 so that the said beams are directed and focused to further receivers and/or transceivers. The detectors, amplifiers, and transmitters may be realised in some embodiments along the same lines as in association with transceiver 50. It is clear that typically the transceivers 50 and 60 are adaptable to a wide range of optical and near IR wavelengths. Inter-lens distances, lens thicknesses and radii, different bias voltages, different circuits, amplification and any prior art devices for changing from one frequency to another may be used in accordance with the invention. The features in FIG. 6 include beam directing devices 600, 610, waveguide interface 620, amplifiers, 650, 660, waveguide interface 690, and beam directing devices 695, 699.

Figure 7:
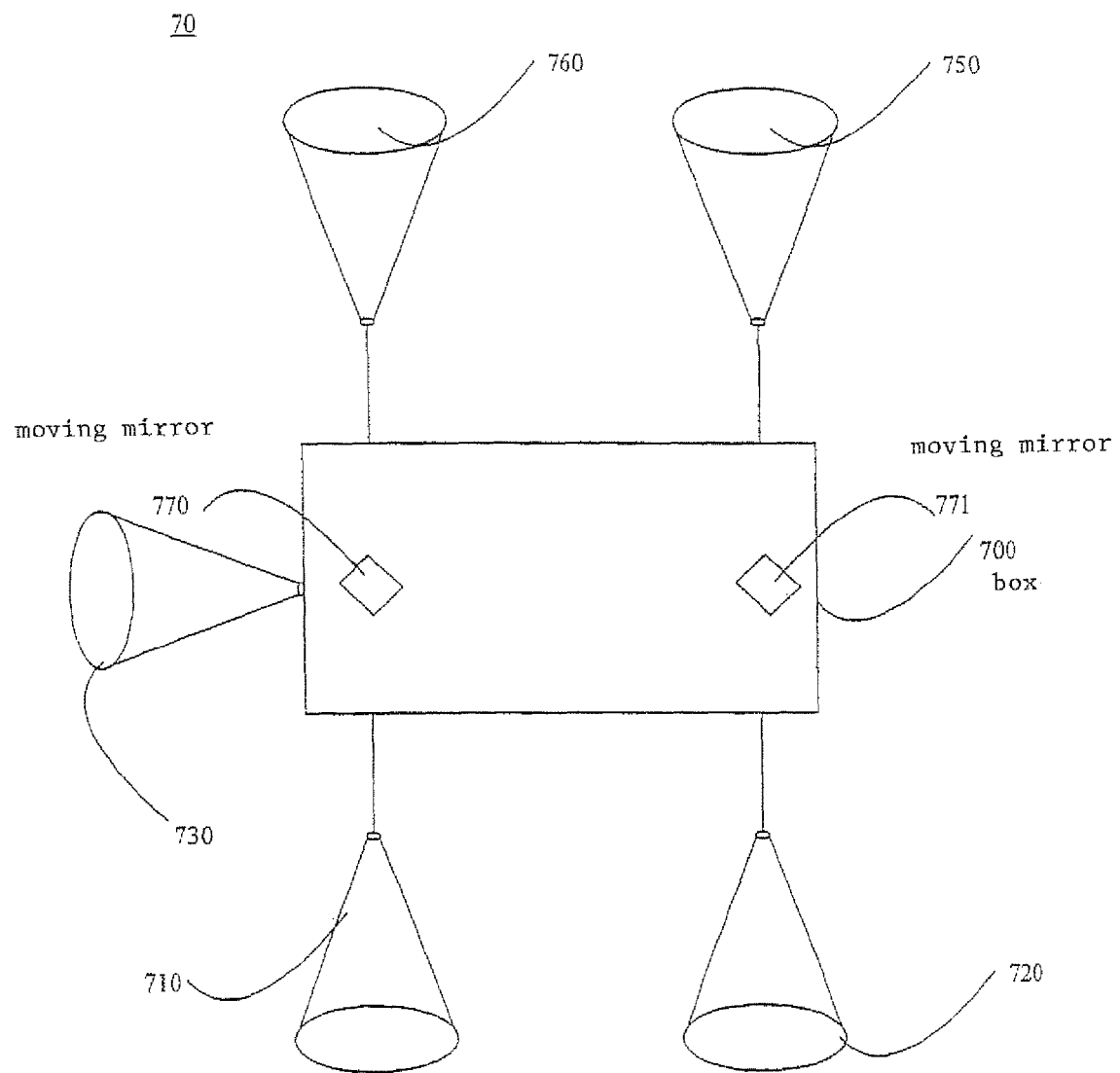
FIG. 7 demonstrates an embodiment of a beam routing device for several communication connections 70 in accordance with the invention.

FIG. 7 exhibits an arrangement 70 comprising a plurality of the receivers and transmitters. In some embodiments several passive or active unidirectional or bi-directional transceivers may be integrated to a single unit, so that beams may be provisioned and relayed from one node to several receiving nodes. In some embodiments the arrangement 70 may operate as a switch. For example the lens-cone systems 710 and 730 could be connected by a waveguide in one particular configuration, but in another configuration the same waveguide could be between 730 and 760. The waveguided connections could be manipulated for example by rotating or moving mirrors 770, 771 inside the box 700. In some embodiments the multiwaveguide cavity 700 may feature diffraction slits for realising redundant rays or amplifiers for amplifying signals. In some embodiments beam compression and or beam expansion may be used to manipulate the beams within the multiwaveguide cavity 700, the transmitter cones and/or receiver cones 710, 720, 730, 740, 750, 760.

Figure 8:
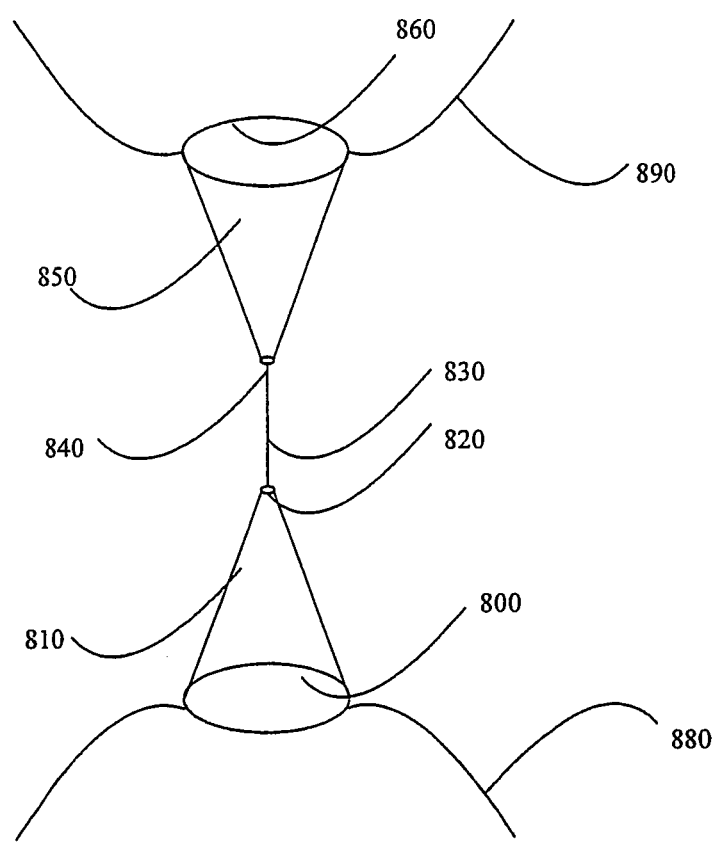
FIG. 8 demonstrates an embodiment of a retroreflective beam reception and routing device 80 in accordance with the invention.

FIG. 8 submits an exemplary arrangement of a passive retroreflective transceiver 80. The transceiver 80 differs from the transceiver 30 in the aspect that it incorporates at least a portion of a retroreflective concave mirror 880, 890 associated with at least one lens 800, 860. The concave mirrors 880, 890 are designed to reflect a portion of the incident beam back to the original transmitter direction for feedback purposes. It is also possible that a retroreflective transceiver in accordance with the invention incorporates unidirectional or bi-directional amplification as outlined earlier or otherwise. The features in FIG. 8 include beam directing device 810, waveguide interface 820, waveguide 830, waveguide interface 840 and beam directing device 850.

Figure 9:
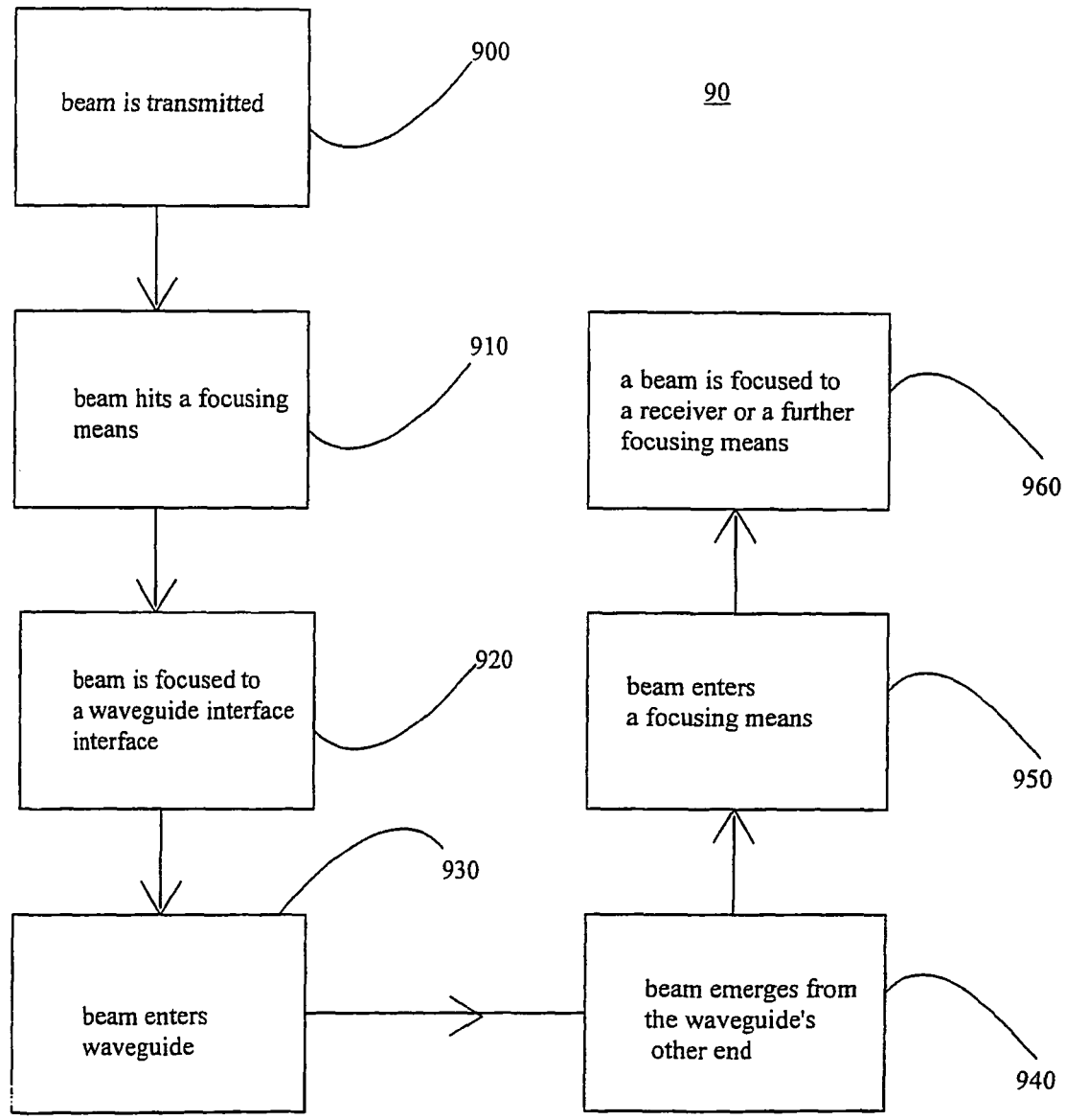
FIG. 9 demonstrates an embodiment of a method for beam routing 90 in accordance with the invention as a flow diagram.

FIG. 9 exhibits a passive beam relay process 90 in accordance with the invention. In phase 900 a beam is transmitted. In phase 910 the beam reaches a focusing means, for example a lens, lens system, mirror, mirror system, or a lens-mirror system. In phase 920 the beam is focused to a waveguide interface. During, before or after the phases 910, 920 the beam may be compressed in some embodiments. In phase 930 the beam enters the waveguide, which is typically made of optical fiber, doped fibre, Erbium-doped optical fibre, glass fibre or a hollow reflective tube, or any totally internally reflective waveguide in some embodiments. In phase 940 the beam emerges from the other end of the waveguide, and enters another focusing device in phase 950. In phase 960 the ray is focused to a receiver or a transceiver, which typically have focusing means as their peripheral interface to the wireless radiation as well. During, before or after the phases 940, 950, 960 the beam may be expanded in some embodiments.

Figure 10:
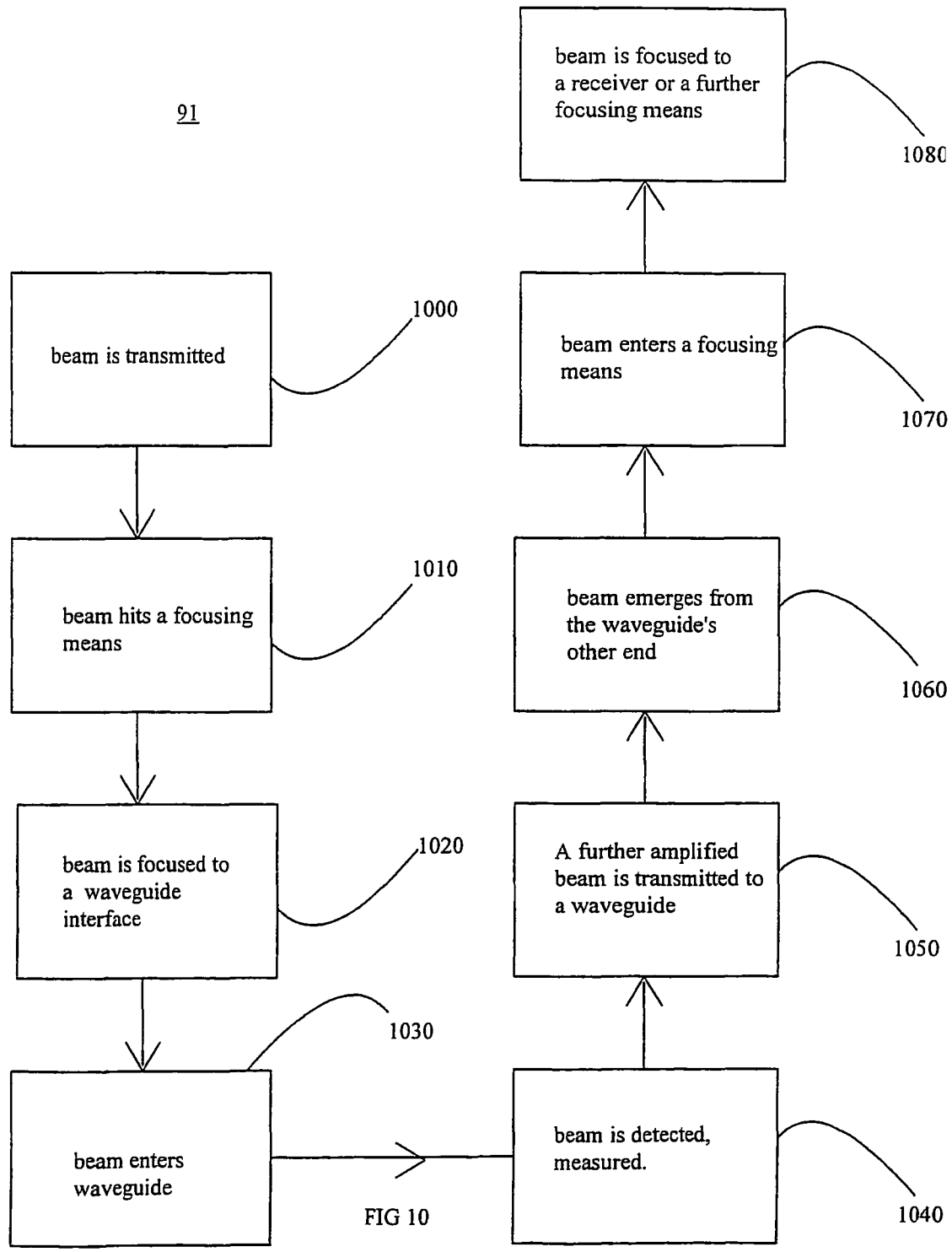
FIG. 10 demonstrates an embodiment of a method for active beam routing and repetition 91 in accordance with the invention as a flow diagram.

FIG. 10 exhibits an active beam relay process 91 in accordance with the invention. In phase 1000 a beam is transmitted. In phase 1010 the beam reaches a focusing means, for example a lens, lens system, mirror, mirror system, or a lens-mirror system. In phase 1020 the beam is focused to a waveguide interface. During, before or after the phases 1010, 1020 the beam may be compressed in some embodiments. In phase 1030 the beam enters the waveguide, and the waveguide channels the beam to a detector, which is typically an APD or any other photoreceiver. In some embodiments, the intensity, amplitude, irradiance, frequency or any other attribute of the beam and incoming radiation are measured during phase 1040. In some embodiments, unwanted signals are filtered with a bandpass filter, or a phase lock filter (based on inversion and integration in some embodiments) in phase 1040. A further amplified beam is transmitted to a waveguide, or several waveguides in phase 1060. In some embodiments redundant beams are channelled to several waveguides by diffracting the amplified primary beam in a slit and collecting the resulting maxima's to the separate waveguides in phase 1050. In phase 1060 the beam enters from the other end of the waveguide, and enters a focusing means, which may comprise beam expansion devices in some embodiments in phase 1070. In phase 1080 the ray is focused to a receiver or a transceiver, which typically have focusing means as their peripheral interface to the wireless radiation as well.

During, before or after any of the phases of methods 90 and 91 the transceiver executing the process may be tuned to the frequency of the beam or all or some parts of the transceiver may be tuned to avoid dispersion, with regard to wavelengths obtained by spectral analysis of the optical path of communication.

Figure 11:
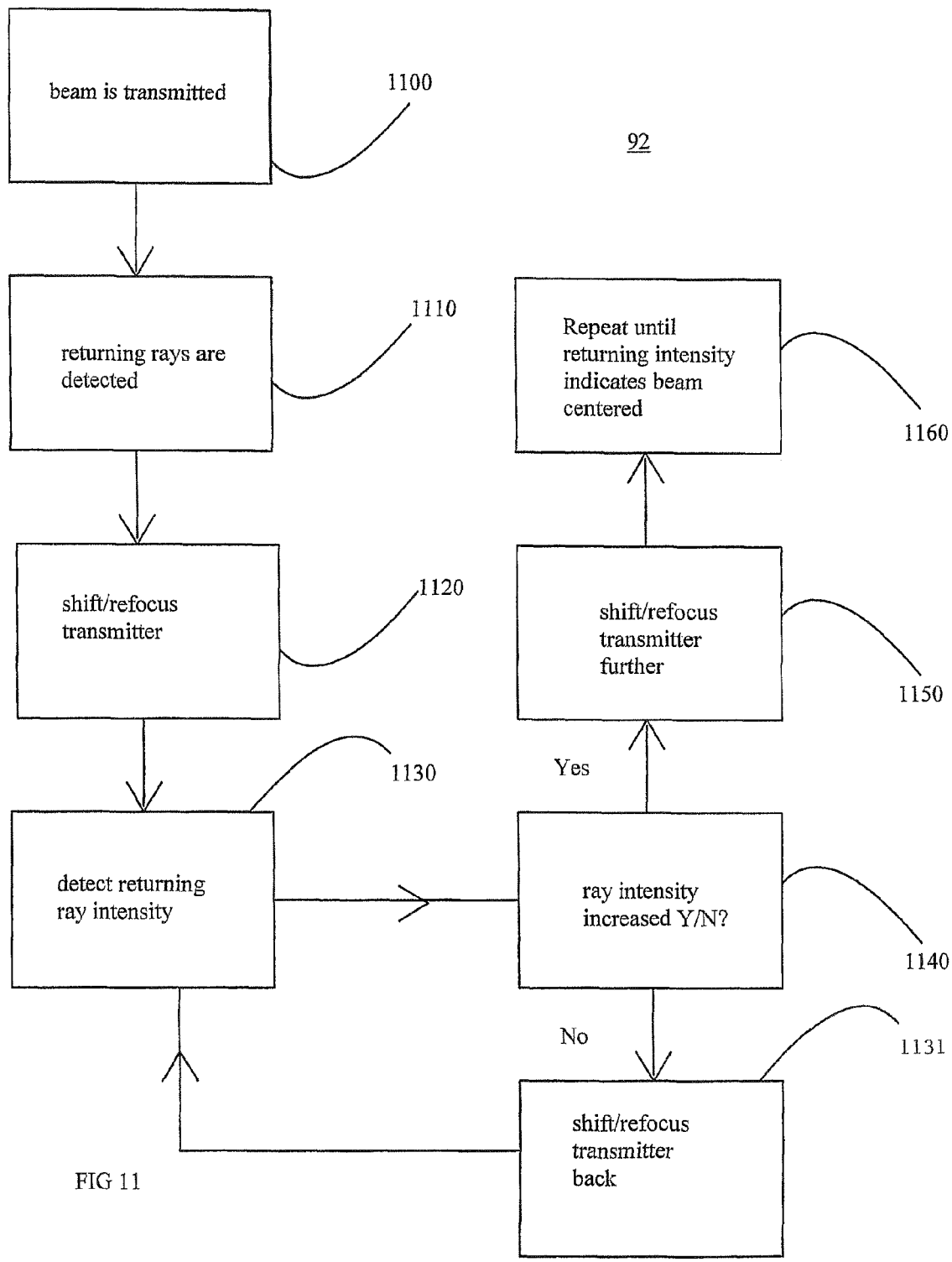
FIG. 11 demonstrates an embodiment of a method 92 for focusing a beam on the retroreflective beam routing device 80 in accordance with the invention as a flow diagram.

FIG. 11 submits an optical method for aligning the transmitted beam to an optimum position with retroreflective receivers. In phase 1100 at least one beam is transmitted. In phase 1110 returning rays that are reflected from the retroreflector of the receiver 92 are detected. In phase 1120 the transmitted beam is shifted and refocused, and in phase 1130 the returning beam intensity is detected as feedback. If the feedback beam intensity has increased, the transmitted beam is probably better focused on the receiver, as the concave retroreflector is designed to reflect the maximum feedback intensity when it is perfectly centered with a beam width the size of the diameter of the receiving retroreflective array. If feedback intensity is increased in phase 1140, the transmitter is shifted further in phase 1150. If not, phase 1131 is entered. By feedback intensity measurements the transmitter beam can be perfectly focused on an all optical retroreflective receiver or transceiver in phase 1160. Optical or radiative acquiring of a receiver has many advantages, one of which is that the retroreflective device may be electrically passive, i.e. it requires no electrical power to communicate its status.

Figure 12:
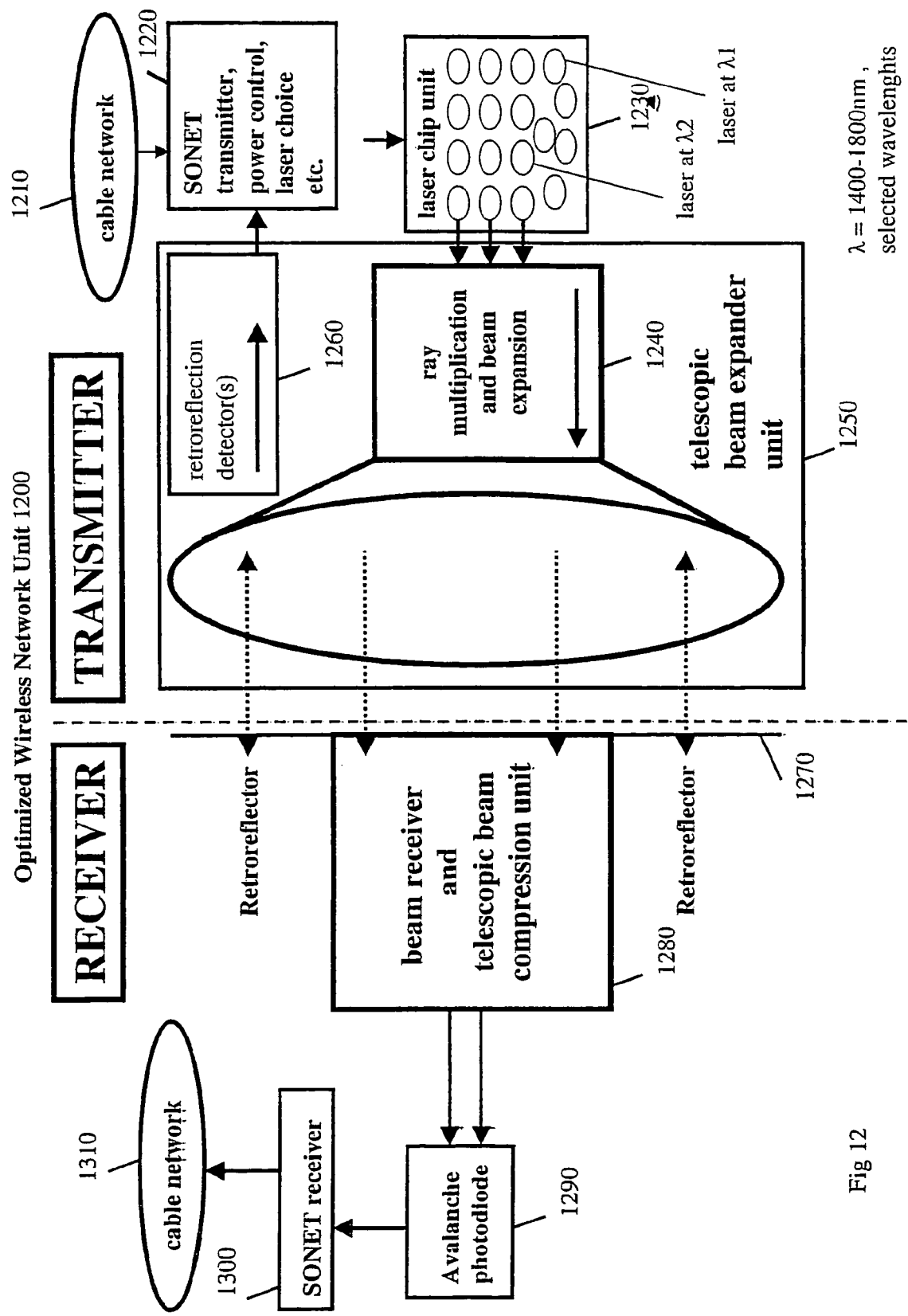
FIG. 12 presents a more developed embodiment of the communication link in accordance with the invention.

FIG. 12 shows also a preferable arrangement 1200 of the laser link in accordance with the invention. 1210 depicts a cable network or WLAN Wireless Local area network, or any other conventional communication network. The SONET transceiver 1220 may also be a SDH transceiver or the like in accordance with the invention. The transceiver 1220 drives the laser chip unit to produce an amplitude modulated communication signal according to the SONET, SDH or like standard.

Typically the bandwidths provided by such transceivers are several gigabits per second. In addition to e.g. SONET modulation, the laser power and the choice of which laser to use on the chip unit are controlled by the associated circuitry. In order to make these decisions, information from retroreflection detectors, which detect retroreflected radiation from the receiver is preferably used.

The laser chip unit 1230 comprises for example 50-150 semiconductor lasers doped on a chip. In some embodiments, each laser transmits a certain wavelength, spaced eg. 1-2 nm apart. The laser chip unit is preferably moderate in size, for example area per laser could for example be 0.5 mm*0.5 mm=0.025 mm. This would render chip size to be of the order of some square centimeters.

The diffractive optics elements 1240 may comprise eg. a slit. The telescopic beam expander and lens unit 1250 is typically arranged to expand and collimate the beam to approx. 2.5 cm diameter, which renders a controllable divergence in a range of few kilometers according to the Gaussian approximation. The telescopic beam expander and lens unit 1250 is preferably non-dispersive, so that at least dynamical adjustments in optics for the majority of different lasers used are unnecessary.

The retroreflection detectors 1260 detect the optical feedback from the receiver's retroreflector. These comprise typically also an APD array that measures the intensity and the wavelength of the radiation returning radiation. The retroreflection detectors 1260 are connected to the transmission control of the transmitter. The retroreflector 1270 may be a parabolic mirror that reflects a portion of the incident radiation field back to the source in some embodiments. The beam receiver 1280 is preferably a lens compression system that receives the expanded beam, and compresses it to the APD.

The APD 1290 takes the incoming photons, converts them to current and feeds the current signal to the SONET device. APD may also be connected to a current-voltage converter, that will feed the voltage signal to the SONET device 1300 if this is required. The SONET, SDH or the like receiver 1300 takes the signal and demodulates it and relays the signal forward in the receiving cable or Wireless LAN or other network 1310.

Signal flow through the aforementioned parts of embodiment 1200 in accordance with the invention comprises a sequence of steps, some of which may include;

Feeding a signal to the cable network at point 1210, for instance with a signal generator. Generated pulse train enters SONET transceiver at 1220 and is modulated according to the SONET standard, or other standard if the transceiver is of a different type. A current or a voltage signal proceeds. Current or voltage drives the semiconductor lasers on the chip and laser/maser light is emitted at point 1230. All of the lasers may be on at once, only some of them, or just the most penetrating or the penetrating few lasers are selected. The lasers on the chip are used to measure the spectral attenuation, by scanning their respective bands or otherwise along the optical path of communication, in some embodiments. In other embodiments, a separate reference beam, or a white light pulse may be used as the light source for composing the spectrum.

At point 1240 the light generated from the lasers is diffracted to form several redundant beams. Redundancy may also be achieved across wavelengths in some desirable embodiments. At point 1250 the laser/maser beams are expanded with the telescopic beam expander in order to reduce divergence. The beam is emitted to the receiver. At point 1260 a portion of the transmitted beam is reflected back by the retroreflector. At point 1270 laser/maser transmission is controlled according to retroreflection detector readings. The beam is optimised with regard to this spectrum.

At point 1280 the received beam is compressed and focused to the APD. At point 1290 APD converts the optical signal to an electrical one. At point 1300 the electrical signal is received from the APD by the SONET receiver. SONET transceiver converts the information signal to a favourable interface desired by the cable network, WLAN, or backhaul network. If the communication is to be continued in SONET, interface adaption is restricted to a bare minimum in some preferable embodiments. At point 1310 signal enters the terminal network.

In some embodiments retroreflectors may be used with any of the devices 10, 11, 30, 40, 50, 60, 70. Any transmitter, receiver or transceiver may comprise filtering devices for example, band pass filters or phase locked filters.

In some embodiments this position scan and the spectral scan are done before or after one another, concurrently or periodically. In some very special embodiments the transmission medium maybe something else apart from air, for example water for submarine communication links.

The scanned band or the range of frequencies used for communication maybe anywhere where frequency dependent attenuation, diffraction and/or refraction by the transfer medium is significant. For the atmosphere this band is from visible ($\lambda$=800-1300 nm) to short wavelength radio ($\lambda$=10 cm-1 m).

The invention has been explained above with reference to the aforementioned embodiments and several commercial and industrial advantages have been demonstrated. The methods and arrangements of the invention allow the provisioning of collimated beams to superiorly longer distances reliably at wavelengths where signal attenuation and beam divergence is small, even at inclement weather such as fog, rain, snow or the like.

The invention makes it possible to relay and redirect beams between two line-of-sight obstructed points with an inventive transceiver. The long range of the parallel coherent light beams at penetrating frequencies in accordance with the invention and the all-optical or semi-optical transceiving solutions allow the affordable provisioning of high bandwidth optical communication connections to devices and buildings that were previously either very expensively connected to the fiber optic backbone networks, expensive low bandwidth radio or microwave networks, or unreachable by traditional free space optics solutions.

The invention has been explained above with reference to the aforementioned embodiments. However, it is clear that the invention is not only restricted to these embodiments, but comprises all possible embodiments within the spirit and scope of the inventive thought and the following patent claims.

The invention claimed is:

1. A wireless beam communication system for the communication of information, comprising:
   at least two transmitters of different types and having all or some parts of the communication system arranged to accommodate at least two wavelengths, at least a first transmitter being a semiconductor laser configured to transmit a first wavelength, and at least a second transmitter being a quantum cascade laser or a maser configured to transmit a second wavelength, the first wavelength and the second wavelength being directed to a same optical carrier beam path of communication; and
   a receiver comprising a retroreflector configured to cause a portion of the transmitted beam of first and second wavelengths to be reflected back from the receiver, and
   either the transmitter or receiver or both belong to a wireless base station backhaul network.

2. The wireless beam communication system according to claim 1, wherein at least one of the first wavelength or the second wavelength is arranged to be chosen based on spectral absorption measurements of the atmosphere in the optical carrier beam path of communication.

3. The wireless beam communication system according to claim 1, further comprising:
   at least one communication signal modulator; and
   at least one spectrometer, wherein the at least one spectrometer is arranged to measure an atmospheric spectral absorption of radiation.

4. The wireless beam communication system according to claim 1, further comprising:
   at least one communication signal modulator; and
   at least one spectrometer, wherein the at least one communication signal modulator is arranged to modulate a signal into at least one carrier beam for the transfer of information in the carrier beam.

5. The wireless beam communication system according to claim 1, further comprising:
   at least one beam expander; and
   at least one spectrometer, wherein
      at least one light beam and/or a light beam with information modulated to the light beam is passed through the beam expander, and
      at least one expanded light beam and/or a light beam with information modulated to the light beam is arranged to be focused to a wireless broadband access receiver or transceiver.

6. The wireless beam communication system according to claim 1, wherein an absorption spectrum of radiation and wavelength are used to optimize an attenuation and a divergence of at least one radiation beam.

7. The wireless beam communication system according to claim 1, wherein at least one reference beam or at least one carrier beam is arranged to scan a spectrum for spectral absorption within an optical path of communication.

8. A wireless communication system, comprising:
at least two transmitters of different types; and
at least one receiver comprising a retroreflector, wherein
at least a first transmitter is a semiconductor laser configured to transmit a first wavelength, and at least a second transmitter is a quantum cascade laser or a maser configured to transmit a second wavelength, the first wavelength and the second wavelength being directed to a same optical carrier beam path of communication,
the reception wavelengths of the at least one receiver are arranged to be applicable to wavelengths transmitted from a semiconductor laser and/or a quantum cascade laser or a maser, and
a portion of the transmitted beam of first and second wavelengths is reflected back from the receiver comprising the retroreflector, and either the transmitter or receiver or both belong to a wireless base station backhaul network.

9. A method for communicating using a wireless optical signal, comprising:
either the transmitter or receiver or both belonging to a wireless base station backhaul network,
providing at least two lasers of different types;
generating at least one light beam with a semiconductor laser configured to transmit a first wavelength transmitting the at least one light beam to at least one receiver comprising a retroreflector;
transmitting at least one light beam with a quantum cascade laser or maser configured to transmit a second wavelength, the first wavelength and the second wavelength being directed to a same optical carrier beam path of communication; and
receiving a portion of the transmitted beam transmitted from one or more of the semiconductor laser, and the quantum cascade laser or the maser from said retroreflector.

10. The method for communicating using a wireless optical signal in accordance with claim 9, wherein spectral absorption of air is measured in an optical path of communication.

* * * * *